Aug. 13, 1968 HISAO MAEDA 3,397,394

THIN FILM MAGNETIC CORE MATRIX MEMORY DEVICE

Filed May 8, 1964

United States Patent Office
3,397,394
Patented Aug. 13, 1968

3,397,394
THIN FILM MAGNETIC CORE MATRIX MEMORY DEVICE

Hisao Maeda, 211 Minamisenzoku-machi, Ota-ku, Tokyo-to, Japan; Hisaaki Maeda, heir of said Hisao Maeda, deceased Filed May 8, 1964, Ser. No. 365,892
Claims priority, application Japan, May 11, 1963, 38/24,881
7 Claims. (Cl. 340—174)

ABSTRACT OF THE DISCLOSURE

A magnetic matrix memory device provided with drive lines and sense lines crossing the drive lines and with output transformers. The sense lines are grouped, and each group of adjacent parallel sense lines, attached to a corresponding output transformer, constitutes a forward and a return line. The primary winding of the attached output transformer is connected at both its terminals to the same side terminals of the sense line group, and the midpoint of the primary winding is grounded. The primary winding has an impedance which is higher than that of the sense lines.

Figure 1:
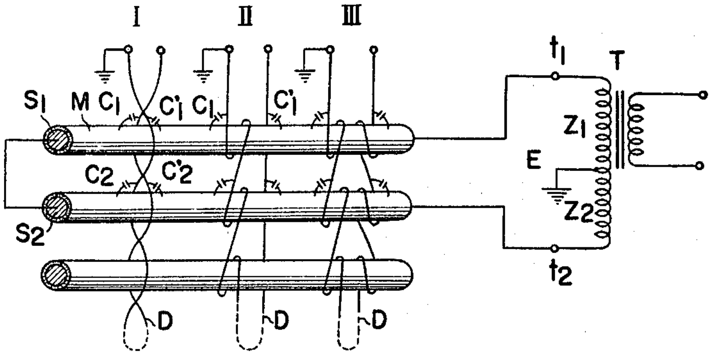

This invention relates to a magnetic core matrix memory device utilizing magnetic films.

In the operation of a magnetic core matrix memory device, even when drive lines and sense lines are electrically insulated from each other, there is a tendency of drive pulses to be transferred to the sense lines through stray capacitances existing between these lines so that in an extreme case correct read-out becomes impossible.

It is, therefore, the principal object of this invention to overcome this difficulty.

The features of the invention which are believed to be novel are set forth with particularity in the appended claims. The invention itself, however, as to its organization together with further objects and advantages thereof, may best be understood by reference to the following description taken in connection with the accompanying drawings, in which the same or equivalent members are designated by the same reference characters, and in which:

FIG. 1 is a diagrammatic representation for explaining the principle of this invention, and FIG. 2 through 5, inclusive, are similar diagrams showing various embodiments of this invention.

Figure 5:
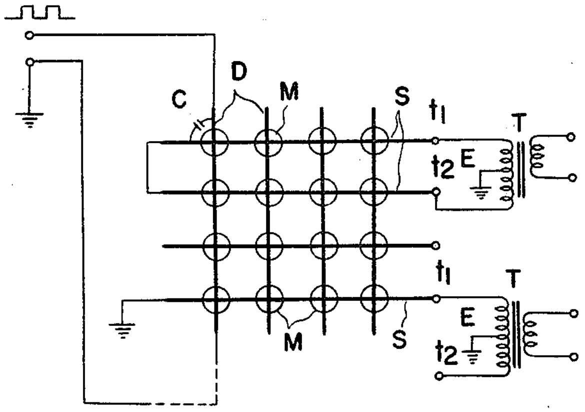

Referring now to FIG. 1 of the accompanying drawings, there is shown a magnetic core matrix memory device including sense lines formed by coating films of ferromagnetic material M, for example, permalloy, up or cores $S_1$, $S_2$ . . . of nonmagnetic material such as copper, molybdenum, and the like by plating, vapor deposition, and the like techniques and drive lines D crossing said sense lines. In FIG. 1 there are shown three methods I, II and III of interlinking the sense and drive lines, and in each case there are stray capacitances between the sense and drive lines, for example, stray capacitances $C_1$ and $C_1'$ between the sense line $S_1$ and the drive lines D and $C_2$ and $C'$ between the sense line $S_2$ and the drive lines D, and so on. As a result, drive pulses flowing through the drive lines D tend to flow into the sense lines $S_1$, $S_2$. . . . Such a difficulty is also encountered when independent flat magnetic films M are deposited on a base plate (not shown), and the respective drive lines D and sense lines S are disposed to cross each other on the respective magnetic films, as shown in FIG. 5.

In order to overcome these difficulties, this invention contemplates connecting the primary winding of an output transformer T across sense lines $S_1$ and $S_2$, designing said primary winding to have larger impedance than the impedances of the sense lines and conductors connecting them to terminals $t_1$ and $t_2$ of the primary winding and also contemplates connecting to ground substantially the midpoint E of the primary winding.

As shown in FIG. 1 where two sense lines $S_1$ and $S_2$ are connected in series to form a closed loop, if it is assumed that $I_1$ and $I_1'$ represent currents through stray capacitances $C_1$ and $C_1'$ associated with the sense line $S_1$ due to a drive pulse and that $I_1$ and $I_2'$ represent the currents through stray capacitances $C_2$ and $C_2'$ associated with the sense line $S_2$, then the expressions $$I_1=I_2,\ I_1'=I_2'$$

may be assumed to be valid because the spacing between sense lines $S_1$ and $S_2$ is very small.

Thus, currents flowing into sense lines because of a drive pulse will flow, with the same magnitudes but with opposite polarities, through the upper and lower halves of the primary winding above and below the midpoint E. Accordingly, they balance out each other, and there results substantially no noise caused by the drive pulse in the secondary side of the output transformer.

Figure 2:
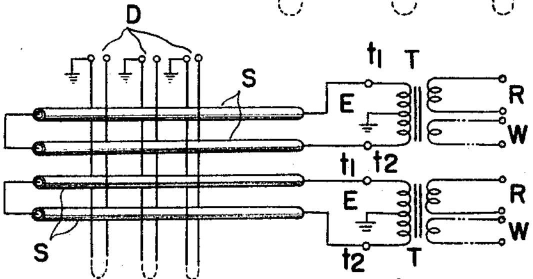

FIG. 2 shows an embodiment of this invention to illustrate an application thereof to a memory circuit comprising a fabric composed of wefts S having magnetic coatings and warps D, it being understood that suitable spacer lines may be interwoven with either or both of the wefts and warps. It can be noted that the method of interlinking the drive lines D and sense lines S is the same as that of FIG. 1–I. In this case two adjacent lines S coated with a magnetic material are connected in series across the primary winding of an output transformer T to derive the output from the secondary winding thereof. This may be conveniently accomplished by interconnecting the ends of adjacent wefts S after the fabric has been woven. It is also to be understood that two secondary windings may be provided for each output transformer T, one, W, for the write-in and the other, R, for the read-out (or to derive the output), or a single winding for both write-in and read-out may be provided.

Figure 3:
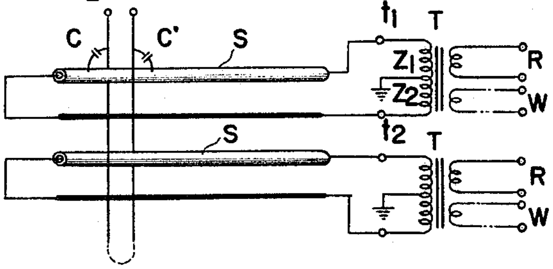
Figure 4:
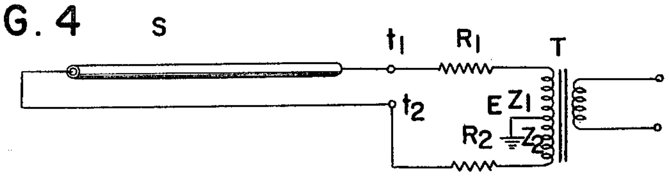

FIG. 3 shows a modification of FIG. 2 wherein one of the sense lines (the line corresponding to $S_2$ in FIG. 1) is replaced by a conventional conductor. In principle, this arrangement is the same as those shown in FIGS. 1 and 2. The thick portion of each conductor may or may not be woven with the sense lines S as the weft.

While the modification shown in FIG. 3 is equivalent to an arrangement wherein the output transformer T is connected across the opposite ends of a single sense line so that the drive currents flowing through the stray capacitance between the sense line and the drive line are inherently unbalanced, if the impedances of the sense line S and the conductor up to terminals $t_1$ and $t_2$ are selected to be lower than the impedances $Z_1$ and $Z_2$ of the primary winding sections of the output transformer, the drive current flowing through the stray capacitance C will flow equally but in opposite directions through the upper and lower sections of the primary winding toward the midpoint E whereby the drive current will not appear in the secondary winding. With regard to the current flowing through the stray capacitance C′, the same relation holds true.

It should be understood that this is true only when the impedance of the sense line S including the conductor extending to terminals $t_1$ and $t_2$ is smaller than the impedances $Z_1$ and $Z_2$ of the output transformer T. In the case where the impedances $Z_1$ and $Z_2$ are not sufficiently high, suitable resistors $R_1$ and $R_2$ may be included between the primary winding of the transformer T and the terminals $t_1$ and $t_2$ thereof.

In a modified construction shown in FIG. 5 wherein magnetic films M are deposited on a base plate (not shown) by vapor deposition or electrolytic plating, it is sufficient to consider only one stray capacitance C between a drive line D and a sense line S′ instead of considering two capacitances C and C′ as in the case of FIG. 3, but it is possible to balance driving currents flowing through the sense line by the same principle as already mentioned in connection with FIG. 3.

While the invention has been explained by describing particular embodiments thereof, it will be apparent that improvements and modifications may be made without departing from the scope of the invention as defined in the appended claims.

What is claimed is:

1. In a magnetic matrix memory device having sense lines, drive lines crossing said sense lines, and at least one transformer, the improvement which comprises said sense lines being arranged in adjacent parallel groups constituting, respectively, a forward line and a return line, each group having a transformer assigned to it, the primary winding of which is connected at both its terminals to the same side terminals of the sense lines of one group, the midpoint of said primary winding being grounded; the impedance of said primary winding being higher than that of said sense lines.

2. The magnetic matrix memory device according to claim 1 wherein each of said sense lines has a coating of ferromagnetic material.

3. The magnetic matrix memory device according to claim 2, wherein said material is permalloy.

4. The magnetic matrix memory device according to claim 1, wherein said sense lines and primary winding are interconnected by conductors.

5. The magnetic memory device according to claim 4 wherein one of said pair of serially connected sense lines is replaced by a simple electric conductor.

6. The magnetic core matrix memory device according to claim 4 wherein resistors are connected between the respective ends of said primary winding and the terminals thereof.

7. A magnetic matrix memory device comprising a plurality of parallel sense lines; a plurality of parallel drive lines disposed at right angles relative to said sense lines; magnetic film disposed at each of the crossing points of said drive lines and sense lines; said sense lines being disposed in groups constituting, respectively, a forward line and a return line; an output transformer assigned to each said group and connected to the same side terminals thereof at its primary winding; the midpoint of said primary winding being grounded; said primary winding having an impedance which is higher than that of said sense lines.

References Cited

UNITED STATES PATENTS

| | | | |
|---|---|---|---|
| 3,112,470 | 11/1963 | Barrett et al. | 340—174 |
| 3,221,312 | 11/1965 | MacLachlan | 340—174 |

BERNARD KONICK, *Primary Examiner.*

P. SPERBER, *Assistant Examiner.*